US008126995B2

(12) United States Patent  
Moorer

(10) Patent No.: US 8,126,995 B2  
(45) Date of Patent: Feb. 28, 2012

(54) MULTI-SOURCE BROADCASTING IN PEER-TO-PEER NETWORK

(75) Inventor: James A. Moorer, Panacea, FL (US)

(73) Assignee: Adobe Systems Incorporated, San Jose, CA (US)

( * ) Notice: Subject to any disclaimer, the term of this patent is extended or adjusted under 35 U.S.C. 154(b) by 87 days.

(21) Appl. No.: 12/144,558

(22) Filed: Jun. 23, 2008

(65) Prior Publication Data

US 2009/0094360 A1 Apr. 9, 2009

(51) Int. Cl.
*G06F 15/173* (2006.01)

(52) U.S. Cl. ........ 709/223; 709/203; 709/219; 709/228; 709/231; 709/238

(58) Field of Classification Search .................. 709/203, 709/219, 228, 231, 238, 204
See application file for complete search history.

(56) References Cited

U.S. PATENT DOCUMENTS

| 7,222,190 | B2 | 5/2007 | Klinker et al. | |
|---|---|---|---|---|
| 7,269,157 | B2 | 9/2007 | Klinker et al. | |
| 7,379,450 | B2 * | 5/2008 | Gu et al. | 370/352 |
| 7,460,495 | B2 * | 12/2008 | Li | 370/267 |
| 7,581,158 | B2 * | 8/2009 | Alstrup et al. | 714/784 |
| 2003/0131258 | A1 * | 7/2003 | Kadri | 713/201 |
| 2003/0212804 | A1 * | 11/2003 | Hashemi | 709/228 |
| 2008/0177833 | A1 * | 7/2008 | Gu et al. | 709/204 |
| 2009/0089352 | A1 * | 4/2009 | Davis et al. | 709/201 |

FOREIGN PATENT DOCUMENTS

| WO | WO 2005091585 A1 | 9/2005 |
|---|---|---|
| WO | WO 2006005334 A1 | 1/2006 |

OTHER PUBLICATIONS

Print Pub; "How We Did It: Marimba Castanet 4.0;" Dennis Williams; Mar. 22, 1999.*
Alstrup, Stephen et al., "Introducing Octoshape-a new technology for large-scale streaming over the Internet", *EBU Technical Review*, Jul. 2005, pp. 1-10.
Print Pub; "How We Did It: Marimba Castanet 4.0;"Dennis Williams; Mar. 22, 2009.
Acharya, et al. "Dissemination-Based Data Delivery Using Broadcast Disks", IEEE Personal Communications, Dec. 1995, pp. 50-60, 11 pages.
BitTorrent, "Technology: Peer Accelerated Content Delivery", downloaded from the internet at http://www.bittorrent.com/dna/technology.html, on Jan. 2, 2008, 3 pages.
Byers, et al. "A Digital Fountain Approach to Asynchronous Reliable Multicast", IEEE Journal on Selected Areas in Communication, vol. 20, Issue 8, Oct. 2002, pp. 1528-1540, 13 pages.
Kazaa, "How Peer-to-Peer (P2) and Kazaa Software Works", downloaded from the internet at http://www.kazaa.com/us/help/new_p2p.htm, on Jan. 2, 2008, 2 pages.

* cited by examiner

*Primary Examiner* — Yves Dalencourt
(74) *Attorney, Agent, or Firm* — Fish & Richardson P.C.

(57) ABSTRACT

A computer-implemented method for broadcasting over a network using peer-to-peer technology including commencing a broadcast over a peer-to-peer network, wherein a control computer selects at least one of multiple computers in the peer-to-peer network as an originating source of the broadcast; and changing the originating source of the broadcast, during the broadcast and as indicated by the control computer, from the at least one of the multiple computers to at least another of the multiple computers.

12 Claims, 6 Drawing Sheets

MULTI-SOURCE BROADCASTING IN PEER-TO-PEER NETWORK

TECHNICAL FIELD

The present disclosure relates to broadcasting over peer-to-peer computer networks.

BACKGROUND

Computer networks can be classified according to: the scale of the network; the hardware technology that is used to connect the individual devices in the network; the network topology upon which the network is based; the communications protocol that is being used on the network; or the functional relationships which exist between the elements of the network, e.g., active networking, client-server and peer-to-peer architectures. Some peer-to-peer computer networks operate transiently over the Internet, enabling an interconnected group of computer users operating with the same networking software application to connect with each other and directly access each other's hard drive files. The peer-to-peer communication model uses diversified connectivity between participants in the network.

In typical peer-to-peer computer networks, all network participants provide resources, including bandwidth, storage space and computing power. Peer-to-peer computer networks use the cumulative bandwidth of network participants rather than conventional centralized resources to provide the core value to a service or application. Peers in the network can download data without relying on a centralized index server. Peer-to-peer computer networks can be constructed as overlay networks built on top of the Internet. Overlay networks can be configured to permit routing messages to destinations without a specified Internet Protocol ("IP") address and to control the sequence of overlay network nodes a message traverses before reaching its destination. The nodes in a network are connection points, either redistribution points or end points, for data transmission. Peers participating in the peer-to-peer network act as nodes in the overlay network. In peer-to-peer architectures, any two nodes that know each other can be linked together through the network.

SUMMARY

This specification describes technologies relating to multi-source broadcasting in peer-to-peer networks. In general, a real-time broadcast can be distributed over interconnected computers that can transmit, receive, view and selectively source the broadcast. Collectively, the interconnected computers, or peers, embody a peer-to-peer network. A control computer can direct the broadcast over the peer-to-peer network. The control computer determines an originating source of the broadcast from at least one of the one or more interconnected computers. The broadcast commences upon the control computer selecting at least one computer in the peer-to-peer network as the originating source of the broadcast. The originating source transmits the broadcast to some of the one or more interconnected computers in the peer-to-peer network, which can in turn, further transmit the broadcast to other computers in the peer-to-peer network, and so on, until each of the interconnected computers receives the broadcast. During the broadcast, the control computer changes the originating source of the broadcast from the at least one computer in the peer-to-peer network to at least another computer in the peer-to-peer network.

In one aspect a computer-implemented method for broadcasting over a network using peer-to-peer technology includes commencing a broadcast over a peer-to-peer network. A control computer selects at least one of multiple computers in the peer-to-peer network as an originating source of the broadcast. During the broadcast and as indicated by the control computer, the originating source of the broadcast is changed from the at least one of the multiple computers to at least another of the multiple computers.

This and other aspects, can be implemented in systems and computer program products, encoded on a computer-readable medium, operable to cause data processing apparatus to perform such operations and can include one or more of the following features. Information for combining content of the broadcast from multiple originating sources selected by the control computer can be specified. Specifying information for combining content of the broadcast can include specifying options for the combining such that a recipient can selectively combine content of the broadcast based on the options. One of the multiple computers can be selected to become the control computer and control of the broadcast can be transferred to the selected one of the multiple computers. A chain of succession for transferring control of the broadcast from the control computer to at least one of the multiple computers can be established. Registration information from at least a portion of the multiple computers can be received at the control computer. A participation list based on the registration information can be generated. Based on the participation list, the peer-to-peer network can be established.

Particular implementations of the subject matter described in this specification can be implemented to realize one or more of the following advantages. For example, real-time broadcasting over a computer network can be improved. In addition, a fully distributed media broadcast network can be implemented using peer-to-peer technologies. For example, by using peer-to-peer technologies, a small number of computers can be used to deliver the broadcast to a larger number of computers. Moreover, this can be done with reduced latency, which can provide significant improvements for real-time media distribution. Thus, the Internet can be efficiently used for real-time media distribution, such as sports broadcasts, live concerts or live news coverage, where the main appeal of the media distribution is often its real-time nature.

Additionally, each computer in the network, or network node, can be an originating source of the broadcast. Moreover, directing the activities of the peer-to-peer network with a control computer enables the originating source of the broadcast to change, dynamically, throughout the broadcasting session. The control computer directs the activities of the peer-to-peer network. Additionally, the control computer determines the originating source or sources of the broadcast and can determine how the broadcast streams are assembled at the participating peer computers. For example, the control computer can change the originating source of the stream from one participating peer computer to another so as to stream different or additional material at a particular time. Thus, the control computer can switch from a "studio" broadcast to a "remote" broadcast simply by changing which participating peer computer is the originating source of the broadcast. Further, the originating source of the broadcast can be changed by the control computer for programming reasons instead of technical reasons, such as bandwidth and latency concerns. For example, the control computer can determine and direct that the natural flow of the broadcast involves a planned switch from one originating source to another originating source so as to provide additional programming to the peer-to-peer network.

Additionally, the control computer can direct the broadcast such that different originating sources transmit different parts of the same real-time broadcast. Moreover, the broadcast can be, but need not be, transmitted by the control computer. By allowing the control computer to source different portions of the broadcast from any participating peer computer registered as an originating source in the peer-to-peer network, it is unnecessary that the entirety of the broadcast be transmitted and combined in one facility before distributing the broadcast to the network, like in television studio broadcasts. Thus, less hardware, video or otherwise, is required at the "studio" for transmitting the broadcast.

Further, multiple computers in the peer-to-peer network can be originating sources of the broadcast. In some implementations, the multiple computers can stream the broadcast simultaneously, whereas in other implementations, the broadcast can be streamed sequentially. In addition, multiple broadcast streams can be combined in each participating peer computer. Multiple computers can be originating sources for parts of the real-time broadcast that can be combined by, e.g., overlay, in each participating peer computer. For example, a real-time interview broadcast can include the interviewer in one stream, and the interviewee in another stream, each occupying one half of the participating peer's computer screen. Although each participating peer computer can receive different portions of the broadcast from different originating sources, in some implementations, participating peers can selectively choose to receive less than all of the different portions of the broadcast. Moreover, participating peer computers can receive edited broadcasts. Further, multiple visual components of the ultimate broadcast can originate from different originating sources. Additionally, participating peer computers can receive overlay animations transmitted from originating sources in the broadcasting session. For example, an animated statistics box broadcast originating from one originating source can be overlaid on a sporting event broadcast originating from another originating source on the recipient participating peer computer. Moreover, participating peers can utilize overlay and compositing software installed on their local computers for combining multiple broadcasts and overlay animations. In some implementations, participating peers can selectively choose to receive and display particular overlay animations.

Furthermore, real-time broadcasting over a peer-to-peer computer network can eliminate the need for a server farm. By eliminating the need for the server farm, the costs associated with building and maintaining such a farm for real-time broadcasts are reduced. Lower end computing devices can be used as servers, making real-time broadcasting of programs over the Internet more affordable. An entire broadcasting network can be implemented in a distributed fashion with very little hardware because the peer-to-peer network uses parts of each participating peer computer to forward the broadcast stream to other participating peers. Thus, the barriers to entry in the real-time broadcasting market can be decreased for smaller producers.

Details of one or more implementations are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

FIGS. 1A-1D show an exemplary peer-to-peer network 100 for broadcasting using peer-to-peer technology. The peer-to-peer network 100 includes multiple computers 110-160 interconnected to one another as peers in the peer-to-peer network 100. Each participating peer computer can act as a node, or a connection point in the peer-to-peer network 100 where information can be transmitted, received, viewed, or selectively created, or sourced. In some implementations, a peer-to-peer software application can be installed, on each participating peer computer. In some implementations, the peer-to-peer software application can be installed prior to the establishment of the peer-to-peer network 100. In other implementations, the peer-to-peer software application can be installed with the establishment of the peer-to-peer network 100.

The peer-to-peer network 100 can be implemented such that each participating peer computer can transmit, receive, and view broadcast streams from an originating source. The originating source can transmit the broadcast and can include one or more participating peer computers in the peer-to-peer network 100. The streamed broadcast can include real-time broadcast streams, previously recorded broadcast stream copies or previously stored broadcast streams. In some implementations, the upload capacity of each participating peer computer can be used to forward all or part of the broadcast stream to other participating peers. Hence, in such an implementation, a very large number of computers can be served from a small number of originating source computers. In some implementations, the network connections in the peer-to-peer network 100 are reversible and therefore any participating peer computer configured to be an originating source can be the originating source of the broadcast. In such an implementation, the peer-to-peer network 100 can be a fully distributed media broadcast network with a plurality of originating sources.

Figure 1A:
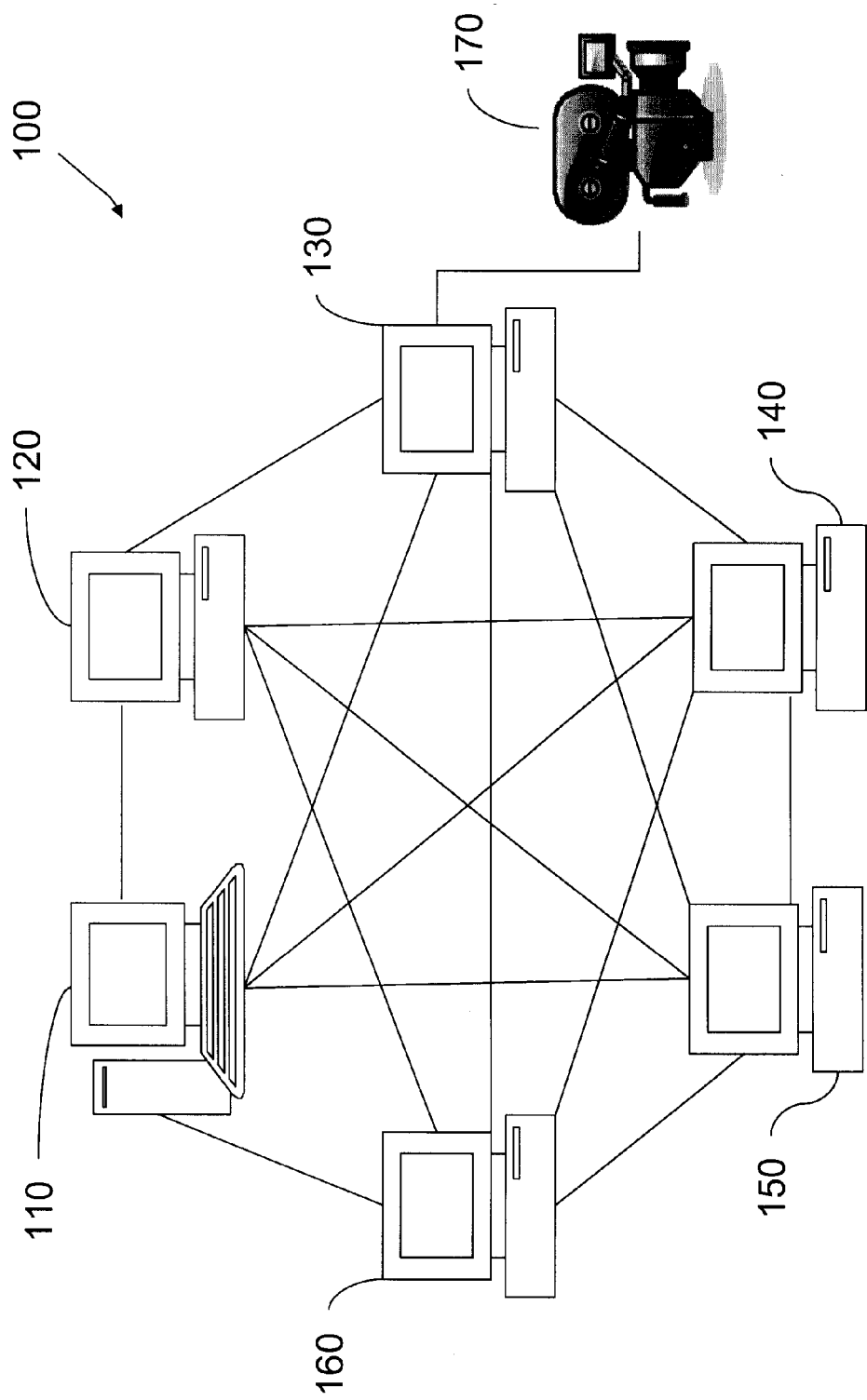
FIGS. 1A-1D show an exemplary peer-to-peer network for broadcasting using peer-to-peer technology.

The activities of the peer-to-peer network 100 are directed by a control computer 110. The control computer 110 can be a single computer, as shown in FIG. 1A, however, in some implementations, more than one computer can serve, simultaneously, as the control computer 110. The control computer 110 determines the originating source or sources of the broadcast. For example, in FIG. 1A, computer 130 has been selected by the control computer 110 to be the originating source of the broadcast. Computer 130 can be connected, as shown, to a video camera 170. Images from the video camera 170 can be transmitted to computer 130. Computer 130 can transmit the images to connected participating peer computers in the peer-to-peer network 100. Each participating peer can receive the video camera 170 images (either directly or indirectly) from the originating source computer 130, display the images and transmit the images to other participating peers in the peer-to-peer network 100.

The control computer 110 can change the originating source of the broadcast from one participating peer to another participating peer. For example, the control computer 110 can switch the originating source of the broadcast from computer 130 to any of the other computers 120, 140, 150, 160 in the peer-to-peer network 100 that have been configured to be an originating source of the broadcast. Such switching can be analogous to a television broadcast control room switching from a "studio" broadcast to a "remote" broadcast. In addition, the control computer 110 can change the originating source of the broadcast back from the new source to the earlier source. In some implementations, the control computer 110 can be the originating source of the broadcast. In some implementations, the control computer 110 can direct the activities of the peer-to-peer network 100 without being part of to the peer-to-peer network 100.

Figure 1B:
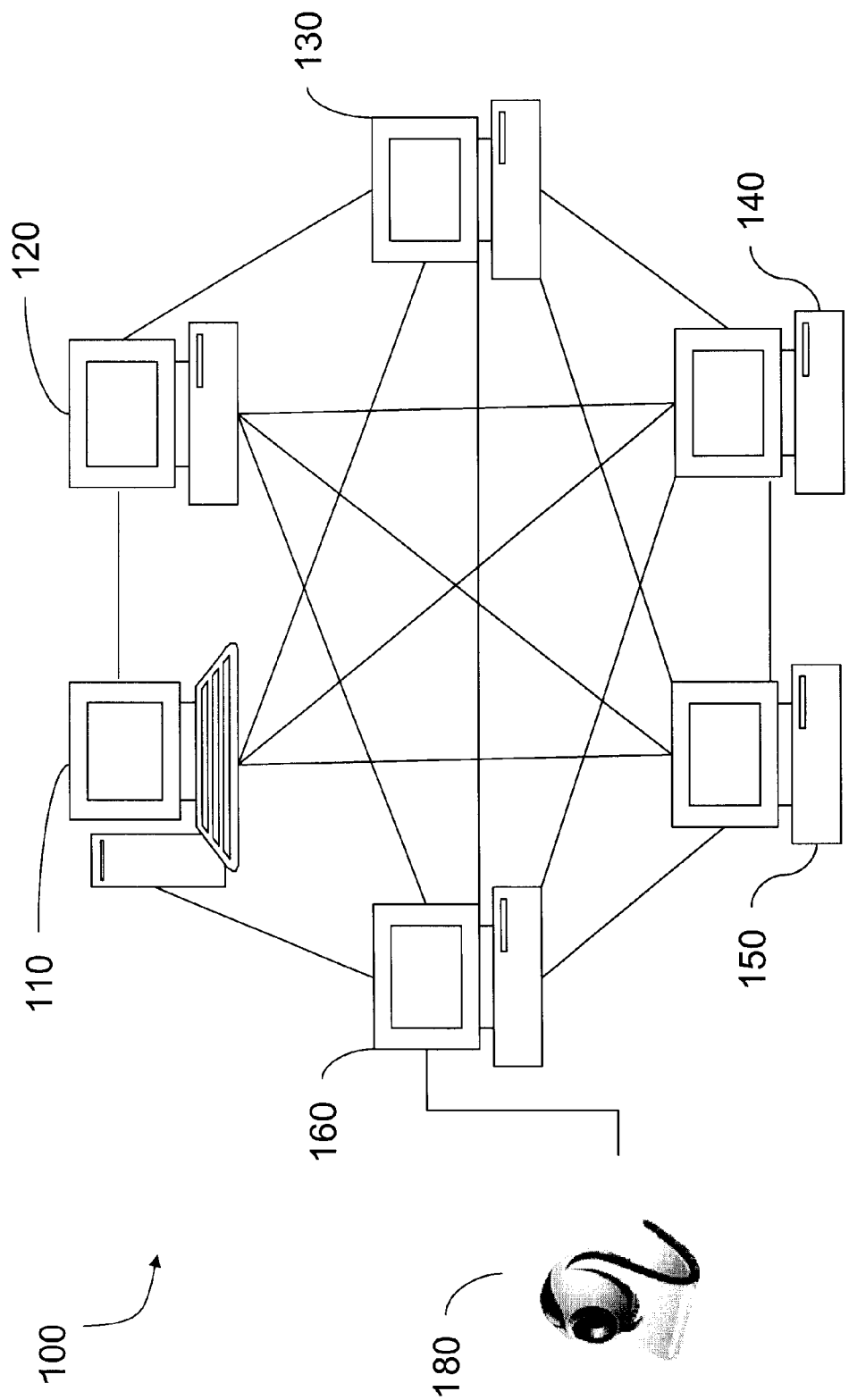

In some implementations, switching the originating source of the broadcast from one participating peer to another participating peer in the peer-to-peer network 100 can be a planned event. For example, the control computer 110 can switch the originating source of the broadcast from computer 130, as shown in FIG. 1A, to computer 160, as shown in FIG. 1B, at a pre-determined time. In such an implementation, computer 160 can be connected to a web-camera 180. Similar to the implementation described above, images from the web-camera 180 can be transmitted to computer 160 and computer 160 can transmit the images to connected participating peer computers in the peer-to-peer network 100.

In some implementations, the control computer 110 can change the originating source of the broadcast from one participating peer to another participating peer on the fly, based on new information. For example, the control computer 110 can change the originating source of the broadcast from computer 130 to computer 160 without having planned or pre-determined the switch. In such an example, the control computer 110 can switch the originating source of the broadcast to computer 160, as shown in FIG. 1B, for, e.g., breaking news. In some implementations, the control computer 110 can select multiple originating sources to stream the broadcast sequentially. For example, the control computer 110 can commence the broadcast with computer 130 as the originating source, then to, e.g., computer 160 as the second originating source, then to, e.g., computer 140 as the third originating source, and so on.

Figure 1C:
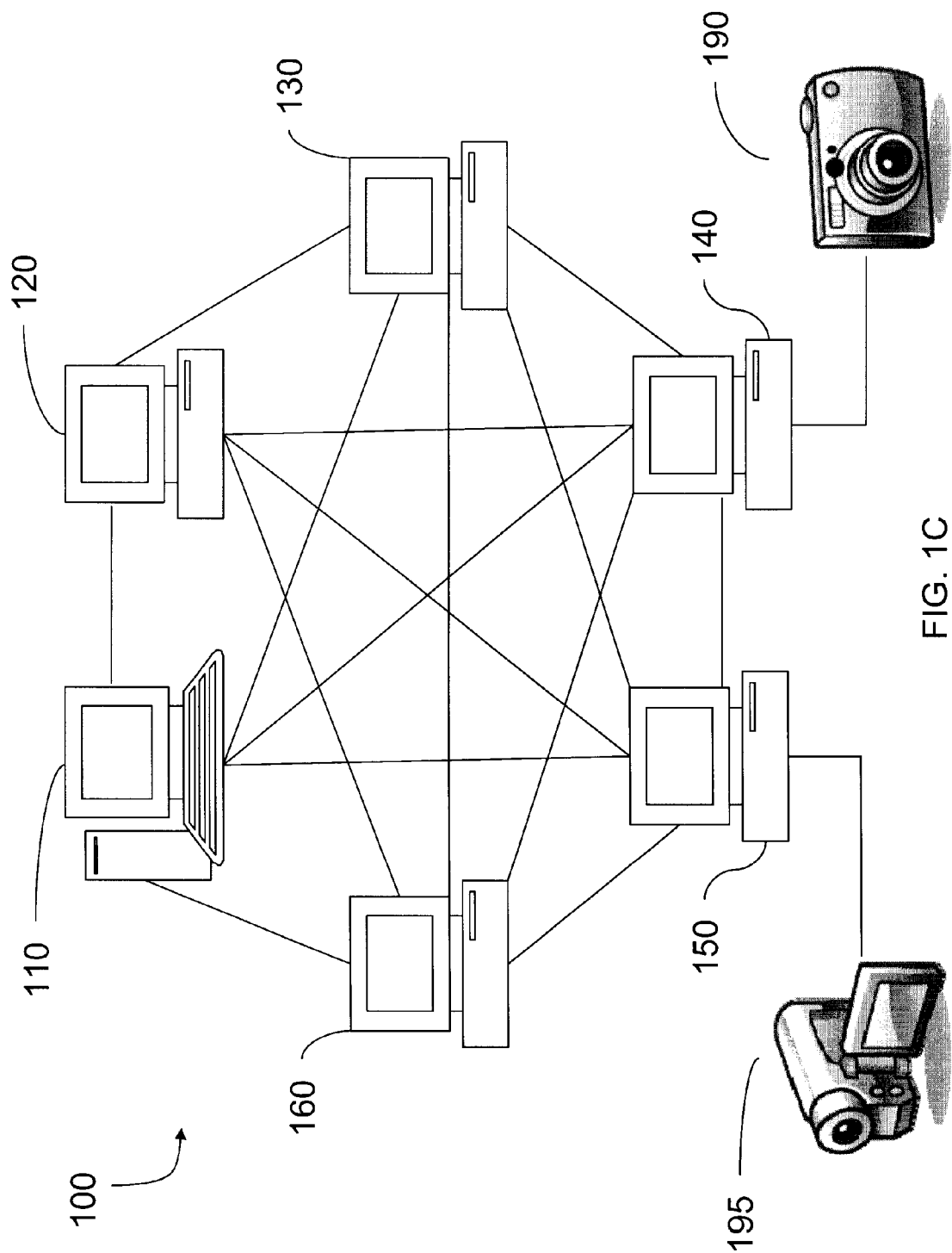

In some implementations, the control computer 110 can select multiple originating sources to transmit the broadcast simultaneously. For example, the control computer 110 can change the originating source of the broadcast from computer 160, as shown in FIG. 1B, to computers 140 and 150, as shown in FIG. 1C, for simultaneous broadcasting. In some implementations, computers 140 and 150 can transmit different temporal parts of the same broadcast simultaneously. For example, computers 140 and 150 can transmit different temporal parts of a political debate with computer 140 focused on the candidates and computer 150 focused on the mediator. In some implementations, computer 140 can be connected to camera 190, and computer 150 can be connected to video camera 195. Similar to the implementations described above, images from the camera 190 and the video camera 195 can be transmitted to computers 140 and 150, respectively, and computers 140 and 150 can transmit the images to connected participating peer computers in the peer-to-peer network 100.

In some implementations, the control computer 110 can specify information for combining broadcast content from the multiple originating sources, e.g., computers 140 and 150, selected by the control computer 110. For example, an interview can be broadcast through the peer-to-peer network 100, where computer 140 can broadcast images of the interviewer provided by camera 190 and computer 150 can broadcast images of the interviewee provided by video camera 195; each broadcast image can occupy one half of the computer screen of each participating peer. The camera 190 and the video camera 195 can provide data other than video information. For example, a spelling bee can be broadcast through the peer-to-peer network 100, where computer 140 can broadcast the proper spelling of the contest word provided by camera 190 and computer 150 can broadcast audio of the spelling participant attempt to spell the contest word provided by video camera 195; each broadcast being received at the computer of each participating peer. In some implementations, the control computer 110 can generate and transmit instructions for synchronizing the broadcast data from computers 140 and 150. For example, the control computer 110 can generate and transmit instructions such that the multiple computers 110-160 can synchronize the broadcast data from computers 140 and 150 by examining the "time-stamps" in which the broadcast data originated. However, broadcast data need not be synchronized when, for example, a "breaking news" overlay is transmitted over the peer-to-peer network 100.

In some implementations, the broadcast content can be combined into a single image in the multiple computers 110-160 of the peer-to-peer network 100. Broadcast streams from multiple originating sources can be composed together for presentation in participating peer computers. For example, a sporting event can be broadcast through the peer-to-peer network 100, where computer 140 can broadcast live footage from the sporting event provided by camera 190, and computer 150 can broadcast an animated statistics box provided by video camera 195; the statistics box can be presented as overlaid on the live footage in the participating peer computers. In some implementations, the statistics box can be presented adjacent the live footage in the participating peer computers.

Figure 1D:
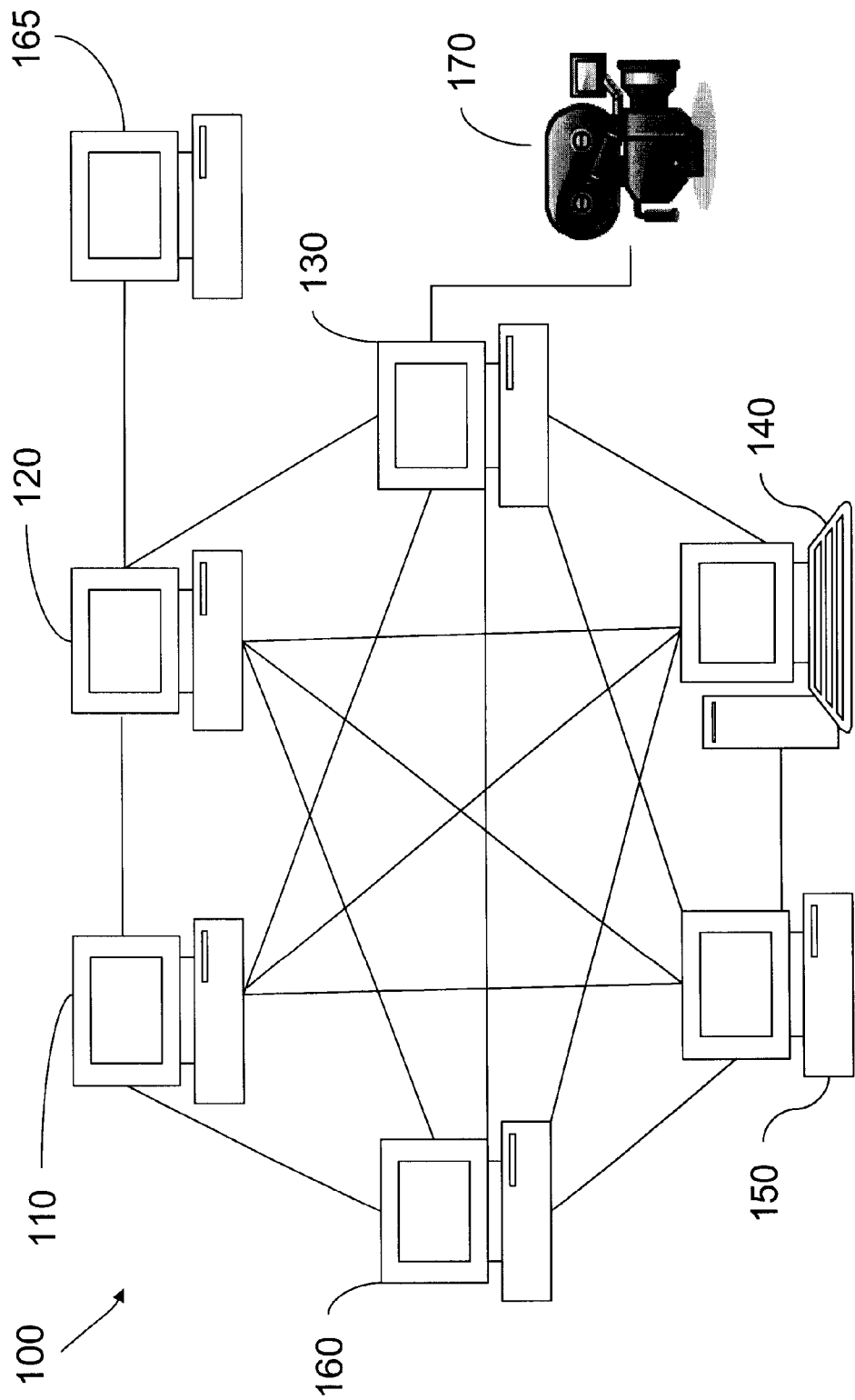

In some implementations, the control computer 110 can be any participating peer in the peer-to-peer network 100. In some implementations, the control computer 110 can select another computer in the peer-to-peer network 100 to become the control computer, and the control computer 110 can transfer control of the entire broadcasting session to that other computer in the peer-to-peer network 100. For example, the control computer 110, as shown in FIGS. 1A-1C, can transfer control responsibilities of the broadcasting session to computer 140, as shown in FIG. 1D. Upon receiving control of the broadcasting session, computer 140 can direct the activities of the peer-to-peer network 100. In some implementations, a default chain of succession can be established for transferring control of the broadcasting session from the control computer 110 to at least one of the other participating peer computers. For example, during the initialization of the peer-to-peer network 100, the chain of succession can be established to ensure that the broadcasting session continues even if the control computer 110 becomes unavailable to continue the control function.

In some implementations, as shown in FIG. 1D, one or more client computers 165 can be connected to the peer-to-peer network 100. Unlike the participating peer computers, the client computer 165 cannot transmit information through the peer-to-peer network 100 but merely receives and displays the information being transmitted through the peer-to-peer network 100. The client computer 165 cannot be an originating source of the broadcast. The new control computer, computer 140, can select computer 130 as the originating source of the broadcast to transmit images from the video camera 170 through the peer-to-peer network 100 to be received and displayed by the client computer 165.

In some implementations, audio links can be maintained among any number of the multiple computers 110-160 that are potential originating sources for the broadcasting session. In some implementations, audio links can be maintained among any number of the participating peers in the peer-to-peer network 100. In some implementations, the audio links can be used to help the operator of the control computer 110 guide the operations of the broadcasting session. For example, the "producer," or the user controlling the entire session, can use the audio links for communicating with the participating peers at the originating sources to ensure that video feeds are cued and ready for broadcast over the peer-to-peer network 100. In some implementations, the real-time broadcast streams can be scaled, shifted in position, or otherwise manipulated for managing latency times between the originating sources transmitting the broadcast and the last of the participating peer computers in the peer-to-peer network 100 to receive the broadcast. In some implementations, and to save the peer-to-peer network 100 bandwidth, much of the computation involved with managing the broadcast streams can be performed at the originating source of the stream. In such an implementation, the participating peers, as well as the client computer 165, need only to perform simple broadcast multiplexing operations to receive and display the broadcast.

In some implementations, the control computer 110 can generate messages specifying combinations for sourcing the broadcast from multiple originating sources and instructions for the participating peer computers to combine the broadcast streams into an ultimate image. In some implementations, the control computer 110 can transmit the messages and the instructions to the participating peer computers as well as the client computers 165. In some implementations, the messages and instructions enable multiple visual components of the ultimate image broadcast from multiple originating sources to be combined in each participating peer computer. In some implementations, specifying information for combining content of the broadcast includes specifying options for the combining such that a recipient participating peer can selectively combine content of the broadcast based on the options. For example, in the aforementioned sporting event broadcast, and with reference to FIG. 1C, the recipient participating peer can selectively choose to receive and display the live footage from the sporting event taken by the camera 190 and originating from computer 140 or the animated statistics box taken by the video camera 195 and originating from computer 150, or both.

In some implementations, the recipient participating peer computer can selectively receive an edited broadcast. An edited broadcast can be transmitted by one or more originating sources that have already determined through which cameras, or other media devices, participating peers can receive and view an event. Thus, the one or more originating sources can edit a broadcast in real-time by switching among the cameras used to capture and transmit the broadcast. For example, a participating peer can select to receive an audio stream of an edited broadcast from one originating source, and a video stream of a separate broadcast from another originating source. Alternatively, a participating peer can select to receive a video stream of a separate broadcast from one originating source overlaid in a "picture-in-picture" configuration on a video stream of an edited broadcast from another originating source.

Figure 2:
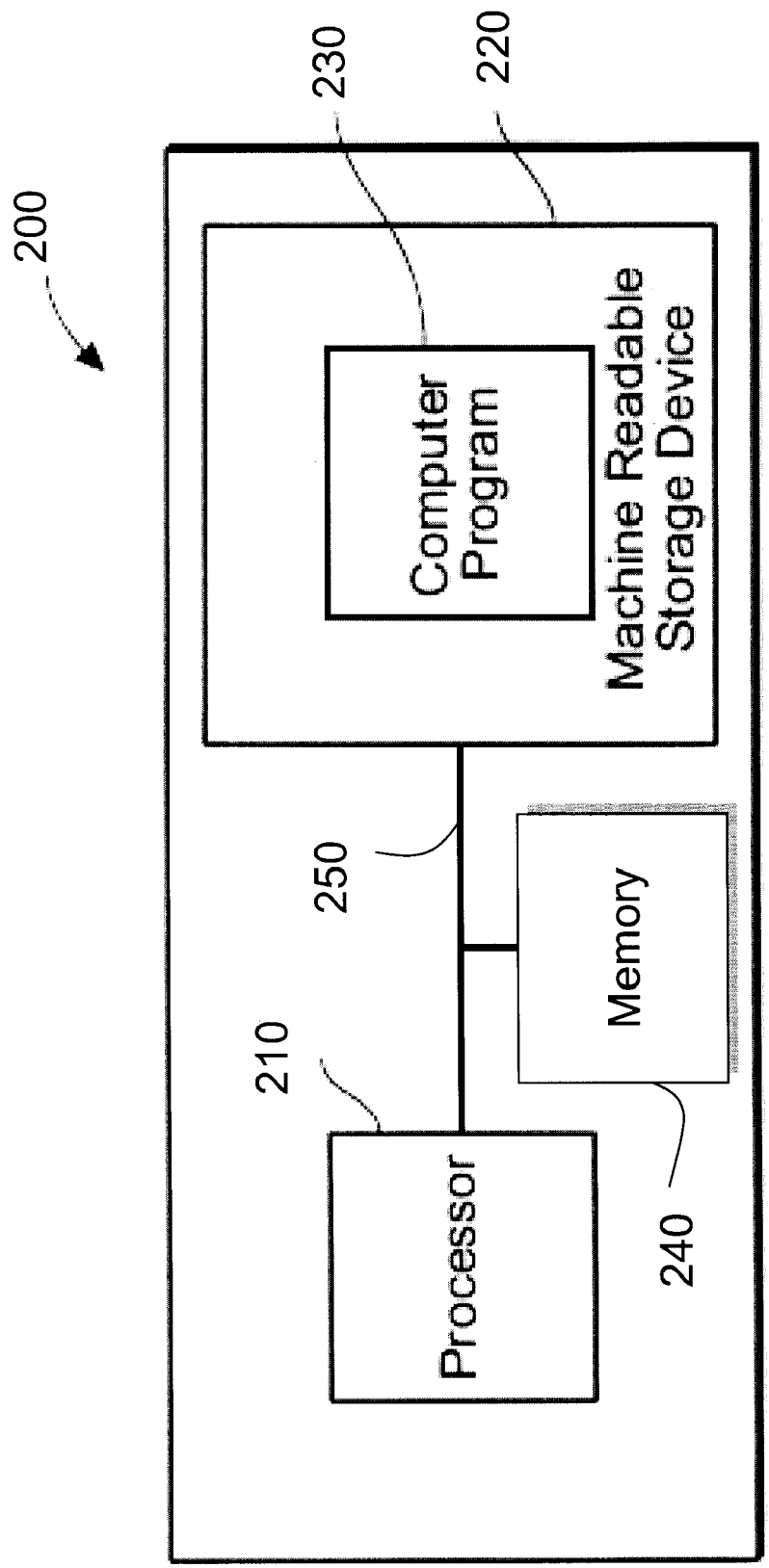
FIG. 2 is a schematic diagram of an example computer system that can be utilized to implement the systems and methods described herein.

FIG. 2 is a schematic diagram of an example computer system 200 that can be utilized to implement the systems and methods described herein. The system 200 includes a processor 210, a machine-readable storage device 220, a computer program 230, and a memory. Each of the components 210, 220, 230, and 240 can, for example, be interconnected using a system bus 250. The processor 210 is capable of processing instructions for execution within the system 200. In some implementations, the processor 210 is a single-threaded processor. In some implementations, the processor 210 is a multi-threaded processor. The processor 210 is capable of processing instructions stored in the memory 240 or on the machine-readable storage device 220.

The memory 240 stores information within the system 200. In some implementations, the memory 240 is a volatile memory unit. In some implementations, the memory 240 is a non-volatile memory unit. The machine-readable storage device 220 is capable of providing mass storage for the system 200. In various implementations, the machine-readable storage device 220 can, for example, include a hard disk device, an optical disk device, or some other large capacity storage device.

Figure 3:
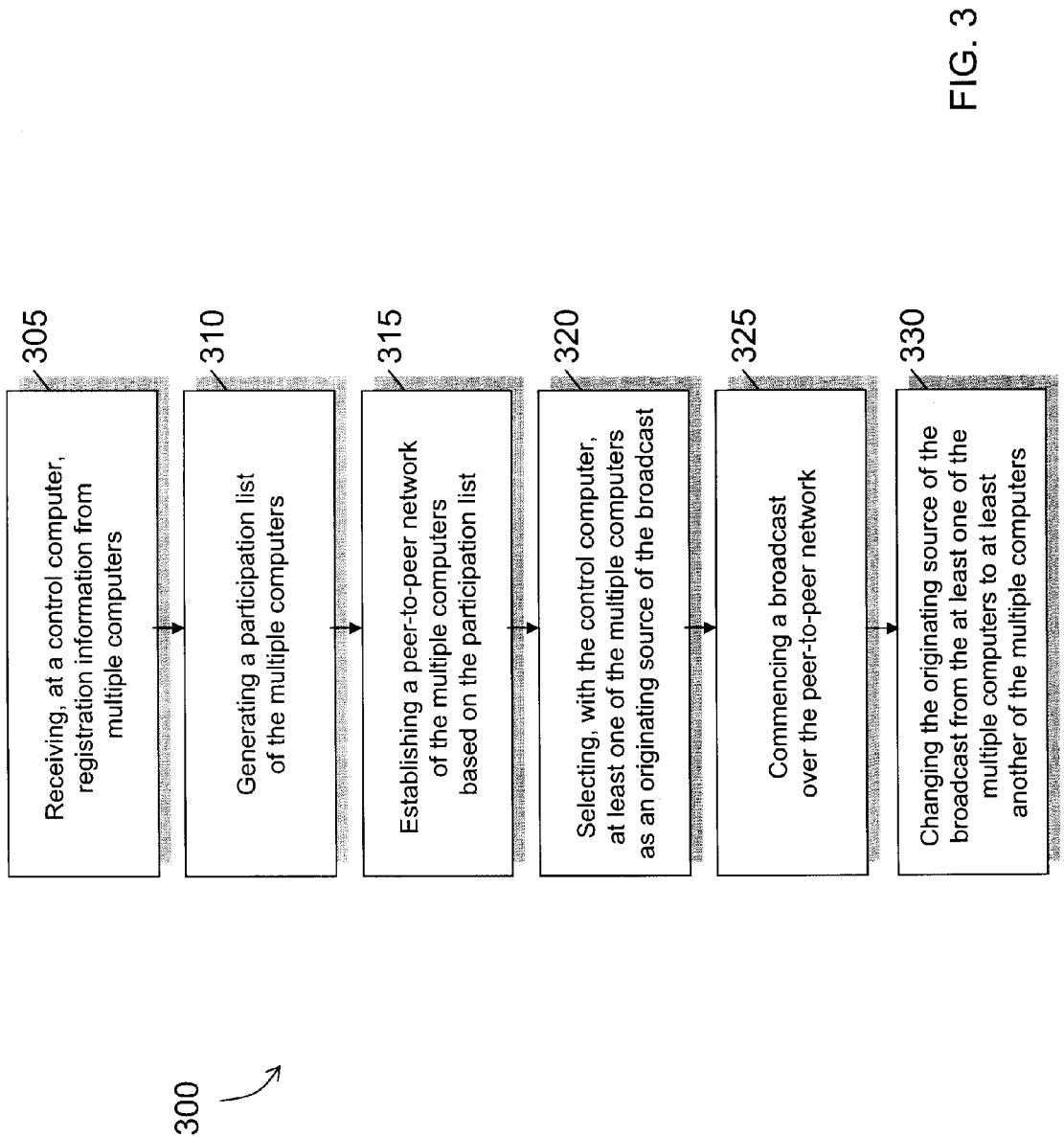
FIG. 3 shows a flowchart of an exemplary process for broadcasting over a network using peer-to-peer technology.

FIG. 3 shows a flowchart of an exemplary process 300 for broadcasting over a network using peer-to-peer technology. The process 300 can, for example, be implemented in the peer-to-peer network 100 depicted in FIGS. 1A-1D.

Registration information from multiple computers can be received at a control computer (305). In some implementations, the control computer can categorize and store the registration information. In some implementations, the control computer can receive registration information from at least a portion of the multiple computers. In some implementations, the registration information can include whether each of the multiple computers can be an originating source of a broadcast. In some implementations, the multiple computers can register as an originating source computer, a participating peer computer or as a client, or view-only, computer. For example, computers that register as originating source computers can selectively transmit the broadcast, receive the broadcast, display the broadcast and source the broadcast. In addition, computers that register as participating peer computers can selectively transmit, receive and display the broadcast. Furthermore, computers that register as client computers can selectively receive and display the broadcast. In some implementations, by registering with the control computer, the multiple computers have indicated a desire to participate in a broadcasting session.

A participation list of the multiple computers can be generated (310). The participation list can include each of the multiple computers registered with the control computer. In some implementations, the control computer generates the participation list. In some implementations, the participation list denotes which of the multiple computers have registered as originating source computers, participating peer computers or client computers. In some implementations, the participation list can be generated based on the registration information. In some implementations, the participation list can be distributed to each of the multiple computers. In other implementations, the participation list is not distributed to the multiple computers. In some implementations, portions of the participation list can be distributed to each of the multiple computers.

A peer-to-peer network of the multiple computers based on the participation list can be established (315). In some implementations, upon receiving, at the control computer, the registration of one single computer, the peer-to-peer network can be established. In some implementations, the peer-to-peer network of the multiple computers is not established until the participation list is generated. In some implementations, the peer-to-peer network can be configured to include only the multiple computers based on the participation list. In other implementations, the peer-to-peer network can be configured to include computers other than the multiple computers registered with the control computer. In such implementations, the peer-to-peer network of the multiple computers can be commingled and overlaid on another peer-to-peer network.

For example, the peer-to-peer network of the multiple computers can be commingled and overlaid on an already established peer-to-peer network, and can include the computers of that peer-to-peer network. In some implementations, the peer-to-peer network can remain established even though one or more of the multiple computers leave the peer-to-peer network.

The control computer selects at least one of the multiple computers as an originating source of the broadcast (320). In some implementations, the control computer can be the originating source of the broadcast. In some implementations, the control computer can select several of the multiple computers as originating sources of the broadcast. In some implementations, the selection of the originating source depends upon bandwidth and latency concerns. In some implementations, the control computer can make an initial determination that the originating source of the broadcast includes enough bandwidth for transmission to other participating peer computers in the peer-to-peer network.

A broadcast over the peer-to-peer network is commenced (325). In some implementations, the broadcast can be an edited broadcast. In some implementations, the broadcast can be multiple broadcasts overlaid on one another and combined in each of the multiple computers. In some implementations, computers failing to register with the control computer before the participation list is generated can be added to the peer-to-peer network after the broadcast has commenced. In some implementations, a subset list can be generated for each of the multiple computers. The subset list can include information for transmitting and receiving the broadcast. For example, the subset list of one computer can include the computers the one computer can receive data from and can send data to within the peer-to-peer network. In some implementations, the broadcast can commence with the control computer, a client computer and an originating source computer as the only broadcast participants. In some implementations, the broadcast can commence before registration information from the multiple computers is received at the control computer.

The control computer changes the originating source of the broadcast from the at least one of the multiple computers to at least another of the multiple computers (330). In some implementations, the originating source of the broadcast can be changed during the broadcast. In some implementations, changing the originating source, which occurs during the broadcast, can be planned before the commencement of the broadcast. In some implementations, the originating source of the broadcast can be changed from the control computer to at least another of the multiple computers. In other implementations, the originating source of the broadcast can be changed from the at least one of the multiple computers to the control computer. In some implementations, the control computer can distribute information about changing the originating source to one or more of the multiple computers, which in turn can forward the information to other of the multiple computers, and so on until all the multiple computers in the peer-to-peer network receive the information.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them.

A computer program (also known as a program, software, software application, script, or code) can be written in any form of programming language, including compiled or interpreted languages, declarative or procedural, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the disclosure have been described. Other implementations are within the scope of the following claims. For example, the actions recited in the claims can be performed in a different order and still achieve desirable results.

What is claimed is:

1. A computer-implemented method for broadcasting over a network using peer-to-peer technology, the method comprising:
commencing a broadcast over a peer-to-peer network, wherein a control computer selects at least one of multiple computers in the peer-to-peer network as an originating source of the broadcast;
changing the originating source of the broadcast, during the broadcast and as indicated by the control computer, from the at least one of the multiple computers to at least another of the multiple computers;
selecting, independently of origination source changing, one of the multiple computers to become the control computer, and transferring control of the origination source changing for the broadcast thereto; and
specifying information for combining content of the broadcast from multiple originating sources selected by the control computer.

2. The computer-implemented method of claim 1, wherein the specifying information for combining content of the broadcast comprises specifying options for the combining such that a recipient selectively combines content of the broadcast based on the options.

3. The computer-implemented method of claim 1, further comprising establishing a chain of succession for transferring control of the broadcast from the control computer to at least one of the multiple computers.

4. The computer-implemented method of claim 1, further comprising: receiving, at the control computer, registration information from at least a portion of the multiple computers; generating a participation list based on the registration information; and establishing the peer-to-peer network based on the participation list.

5. A computer program product having instructions stored on a computer-readable storage medium to cause data processing apparatus to perform operations comprising:
commencing a broadcast over a peer-to-peer network, wherein a control computer selects at least one of multiple computers in the peer-to-peer network as an originating source of the broadcast;
changing the originating source of the broadcast, during the broadcast and as indicated by the control computer, from the at least one of the multiple computers to at least another of the multiple computers;
selecting, independently of origination source changing, one of the multiple computers to become the control computer, and transferring control of the origination source changing for the broadcast thereto; and
specifying information for combining content of the broadcast from multiple originating sources selected by the control computer.

6. The computer program product of claim 5, wherein the specifying information for combining content of the broadcast comprises specifying options for the combining such that a recipient selectively combines content of the broadcast based on the options.

7. The computer program product of claim 5, further comprising establishing a chain of succession for transferring control of the broadcast from the control computer to at least one of the multiple computers.

8. The computer program product of claim 5, further comprising: accepting, at the control computer, registration information from at least a portion of the multiple computers; generating a participation list based on the registration information; and establishing the peer-to-peer network based on the participation list.

9. A system for broadcasting over a network using peer-to-peer technology, the system comprising:
multiple computers in a peer-to-peer network; and a control computer configured to perform operations, comprising: commencing a broadcast over the peer-to-peer network, wherein the control computer selects at least one of the multiple computers in the peer-to-peer network as an originating source of the broadcast;

changing the originating source of the broadcast, during the broadcast and as indicated by the control computer, from the at least one of the multiple computers to at least another of the multiple computers;

selecting, independently of origination source changing, one of the multiple computers to become the control computer, and transferring control of the origination source changing for the broadcast thereto; and specifying information for combining content of the broadcast from multiple originating sources selected by the control computer.

10. The system of claim 9, wherein the specifying information for combining content of the broadcast comprises specifying options for the combining such that a recipient selectively combines content of the broadcast based on the options.

11. The system of claim 9, wherein the operations further comprise establishing a chain of succession for transferring control of the broadcast from the control computer to at least one of the multiple computers.

12. The system of claim 9, wherein the operations further comprise: receiving, at the control computer, registration information from at least a portion of the multiple computers; generating a participation list based on the registration information; and establishing the peer-to-peer network based on the participation list.

* * * * *